US012607994B2

(12) United States Patent
Edwards et al.

(10) Patent No.: US 12,607,994 B2
(45) **Date of Patent: *Apr. 21, 2026**

(54) MACHINE LEARNING FOR DETECTING AND MODIFYING FAULTY CONTROLS

(71) Applicant: Capital One Services, LLC, McLean, VA (US)

(72) Inventors: Joshua Edwards, Philadelphia, PA (US); Jennifer Kwok, Brooklyn, NY (US); Albert Hergenroeder, New York, NY (US); Tyler Maiman, Melville, NY (US); Sarah Jane Cunningham, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 825 days.

This patent is subject to a terminal disclaimer.

(21) Appl. No.: 18/056,851

(22) Filed: Nov. 18, 2022

(65) Prior Publication Data

US 2024/0168472 A1 May 23, 2024

(51) Int. Cl.
*G05B 23/02* (2006.01)
*H04L 41/16* (2022.01)

(52) U.S. Cl.
CPC ..... *G05B 23/0272* (2013.01); *G05B 23/0281* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 11,394,629 | B1 * | 7/2022 | Grilli | G06F 7/08 |
| 2017/0244608 | A1 * | 8/2017 | Reaux-Savonte | G06N 20/00 |
| 2021/0028975 | A1 * | 1/2021 | Mortensen | H04L 41/064 |
| 2021/0037044 | A1 * | 2/2021 | Achanta | G06V 10/82 |
| 2021/0117868 | A1 * | 4/2021 | Sriharsha | G06N 20/20 |
| 2021/0241040 | A1 * | 8/2021 | Tong | G06N 3/048 |
| 2022/0078071 | A1 * | 3/2022 | Agapitos | H04L 41/16 |
| 2023/0305549 | A1 * | 9/2023 | Patil | G06F 16/383 |
| 2024/0134774 | A1 * | 4/2024 | Sydow | G06F 16/215 |

FOREIGN PATENT DOCUMENTS

WO WO-2021073707 A1 * 4/2021 ............. H04L 41/16

* cited by examiner

*Primary Examiner* — Haimei Jiang
(74) *Attorney, Agent, or Firm* — Foley & Lardner LLP

(57) ABSTRACT

In some aspects, a computing system may use machine learning to determine whether a control is faulty or generate recommendations to make a modification to a control. may identify a portion of problematic computer code that implements the faulty control through the use of machine learning. A computing system may use machine learning to generate embeddings that map incident data and control data (e.g., computer-readable code of a control) to the same vector space. Further, a computing system may use a weighting mechanism that may be used to weight each sample used to train a machine learning model, which may allow a model to train more efficiently.

20 Claims, 6 Drawing Sheets

500

100

400

500

<u>600</u>

MACHINE LEARNING FOR DETECTING AND MODIFYING FAULTY CONTROLS

SUMMARY

Controls may be used in a variety of contexts to prevent incidents and ensure that computing systems are working properly. A control may be implemented in computer-readable code. Controls may be designed to detect errors or irregularities that may have occurred, correct errors or irregularities that have been detected, or prevent errors and irregularities from occurring in the first place. For example, an information technology control may be implemented to continuously monitor computing systems and associated software to alert when suspicious or unauthorized activity takes place. Controls may be automated, manual or hybrid. For example, a control may be implemented in computer code, may be written in text, or may be a mixture of both code and text.

Despite being designed to prevent incidents, controls may fail and incidents may occur. For example, a control may fail to prevent a cybersecurity incident from occurring, even though the control was designed to prevent the incident. If an incident occurs, it may be a sign that the control is insufficient and should be modified. In some cases, many controls (e.g., hundreds, thousands, etc.) may be deployed by an organization to prevent incidents. One problem with existing systems is that when an incident occurs, it is difficult to identify which controls are related to the incident thus making it difficult to determine which controls should be modified or improved to prevent future incidents from occurring. For example, existing systems are unable to identify what portion of computer-readable code should be modified in a control to prevent similar incidents from occurring in the future. Further, existing systems are unable to determine whether new controls should be created because due to the existence of thousands of controls, it may not be clear that no existing control is designed to prevent the incident that occurred.

To address these issues, systems and methods described herein use machine learning to determine whether a control is faulty and should be modified, or to generate recommendations to make the modification. Specifically, methods and systems described herein may identify a portion of problematic computer code that implements the faulty control through the use of machine learning. A computing system may use machine learning to generate embeddings that map incident data and control data (e.g., computer-readable code of a control) to the same vector space. By mapping incident data and control data to the same vector space, the computing system may identify which portion of a control is related to the incident and make a recommendation for modification. By doing so, the computing system is able to determine modifications for controls that may be made to prevent future incidents thereby providing a number of benefits including increasing a computing system's security and usability, reducing downtime, and other benefits.

In some aspects, a computing system may detect an incident indicative of a computing system malfunction. Based on detection of the incident, the computing system may obtain incident data comprising a text description. The computing system may generate, via a machine learning model, a first embedding based on the incident data, the first embedding being an embedding of a portion of the incident data, the machine learning model having been trained on a corpus comprising incident text descriptions and control data, generating a plurality of control embeddings corresponding to a plurality of controls, wherein each control of the plurality of controls comprises computer-readable code for preventing one or more corresponding incidents. The computing system may determine that the first embedding and a second embedding of the plurality of control embeddings satisfy a similarity threshold. Based on the first embedding and the second embedding satisfying the similarity threshold, the computing system may identify a portion of a control that is associated with the second embedding and generate an alert related to updating the portion of the control.

An additional shortcoming with existing systems is that they are unable to determine and fix faulty controls before incidents occur. For example, it would be beneficial to be able to identify faulty controls before an incident that is directly related to the faulty control occurs. To solve this problem, non-conventional methods and systems described herein train a machine learning model that can identify faulty controls and generate recommendations for modifications of the faulty controls before an incident occurs. A computing system may train a machine learning model using a training dataset that includes previous faulty controls and the modifications made to correct them. By doing so, the computing system can learn to identify a faulty control before an incident occurs, thereby preventing a variety of problems before they occur (e.g., preventing cyber security incidents related to cybersecurity controls, preventing computer networking incidents related to networking controls, etc.).

In some aspects, a computing system may obtain incident data indicative of a computing system malfunction, wherein the incident data comprises text description of an incident associated with the incident data. The computing system may generate, via a machine learning model, a first embedding based on the incident data, the first embedding being an embedding of a portion of the incident data, the machine learning model having been trained on a corpus comprising incident text descriptions and control data. The computing system may determine that the first embedding and a second embedding associated with a control satisfy a first similarity threshold. Based on the first embedding and the second embedding satisfying the first similarity threshold, the computing system may obtain second text associated with the control. The computing system may generate a training sample comprising the second text and a modification to the second text for preventing future incidents. The computing system may train, based on a training dataset comprising the training sample, a machine learning model to recommend modifications for faulty controls.

Further, training a machine learning model to identify faulty controls or make recommendations to modify faulty controls creates an additional technical problem in that the training is overly time consuming and requires a great deal of computing resources. Part of the reason it is time consuming to train machine learning models is that it is difficult to obtain high quality training data. Additionally, existing systems are unable to determine the quality of training data for training a machine learning model to identify faulty controls or make recommendations to improve the faulty controls.

To improve the quality of the training data, and thereby increase the efficiency of a computing system to train machine learning models, non-conventional methods and systems described herein provide a weighting mechanism that may be used to weight each sample used to train a machine learning model. This allows the model to train more quickly and effectively, which improves the computing system's performance in identifying faulty controls (e.g., with improved accuracy/precision/recall/etc.). A computing system may use data associated with controls and writers of the controls to generate a score corresponding to the experience level of a user that wrote a control. The score can be used to weight a training sample that includes a control written by the user.

In some aspects, a computing system may receive a plurality of network controls comprising (i) a first network control having a first text description and associated with a first label indicating whether the first network control is faulty and (ii) a second network control having a second text description and associated with a second label indicating whether the second network control is faulty. The computing system may obtain control experience scores associated with users that submitted the plurality of network controls. The control experience scores may include (i) a first control experience score indicating a first experience level of a first user and (ii) a second control experience score indicating a second experience level of a second user. The first control experience score may have been generated based on user information that includes a number of network controls viewed or submitted by the first user and feedback indicating the quality of network controls submitted by the first user.

The computing system may generate, as part of a training dataset, a first training sample that includes the first text description of the first network control and a first label indicating whether the first network control is faulty. In response to the first control experience score satisfying a threshold score, the computing system may generate the first training sample and include it as part of the training dataset. In response to the second control experience score failing to satisfy the threshold score, the computing system may avoid using the second network control as part of the training dataset. The computing system may weight the first training sample using a weight derived from the first control experience score. The computing system may train a machine learning model to detect faulty network controls using the first training sample of the training dataset by applying a first weight derived from the first control experience score to the first training sample.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
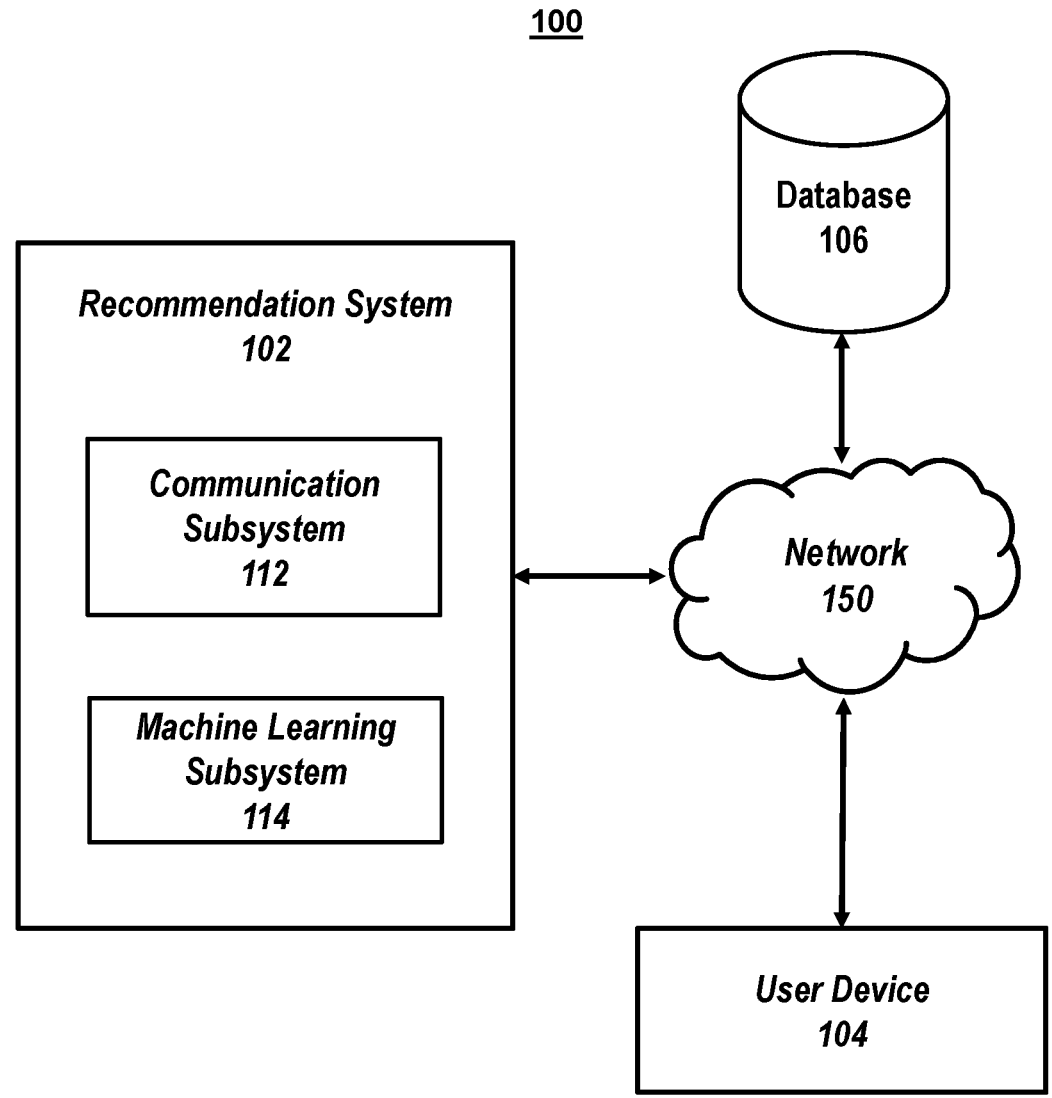
FIG. 1 shows an illustrative diagram for using machine learning to detect faulty controls, in accordance with one or more embodiments.

FIG. 1 shows an illustrative system 100 for using machine learning to detect faulty controls. The system 100 includes a recommendation system 102, a database 106, and a user device 104 that may communicate with each other via a network 150. The recommendation system 102 may include a communication subsystem 112, a machine learning subsystem 114, or other components.

The control system 102 may use machine learning to identify whether a control should be modified or to generate recommendations to make the modification. In one example, the control system 102 may identify a portion of problematic computer code that implements the faulty control through the use of machine learning. For example, the control system 102 may use machine learning to generate embeddings that map incident data and control data (e.g., computer-readable code of a control) to the same vector space. By mapping incident data and control data to the same vector space, the computing system may identify which portion of a control is related to the incident and make a recommendation for modification. By doing so, the computing system may be able to determine modifications for controls that may be made to prevent future incidents thereby providing a number of benefits including increasing a computing system's security and usability, reducing downtime, and other benefits.

As used herein, a control may be any process, procedure, or safeguard that protects an organization from uninformed or inappropriate decisions or actions by any cause within the organization or outside of the organization. A control may be written in text or may be implemented (e.g., partially or fully) in computer code. A control may include a method or procedure used to provide reasonable assurance that an organization's objectives and goals will be met. A control may be used to ensure the reliability and integrity of information of a computing system; compliance with policies, procedures, plans, laws and regulations; the safeguarding of assets; the economical and efficient use of resources by a computing system or organization; or the accomplishment of established objectives and goals of an organization.

A control may be an information technology control. An information technology control may include text, images, or computer code that indicates activities performed by persons or systems. An information technology control may be designed to ensure that business objectives are met. A control may be a network control. A network control may be any control related to the use of a computer network. For example, a network control may keep unauthorized users and devices out of a private network. Organizations that give certain devices or users from outside of the organization occasional access to the network can use network access control to ensure that these devices meet corporate security compliance regulations. For example, a network control may restrict access by users or other computing systems to only those devices that are authorized and compliant with security policies (e.g., computing systems that have security patches and anti-intrusion software required by an organization).

A faulty control may be any control that fails to protect an organization or entity as intended. For example, a control that is intended to prevent unauthorized devices from connecting to a private network, but fails to do so may be a faulty control. As an additional example, a control may be designed to prevent an organization's employees from speaking profanely to customers and may include randomly sampling calls from the previous quarter to ensure there is no profanity used. In this example, the control fails to prevent the use of profanity, the control may be a faulty control.

The control system 102 may detect an incident indicative of a computing system malfunction. As used herein, an incident may include any event that disrupts an organization's operational processes or reduces the quality of a service (e.g., a computing service). For example, an incident may include a cybersecurity breach in which one or more computing systems is infiltrated. As an additional example, an incident may include the failure of a computing system that causes a service provided by the computing system to no longer function. As an additional example, an incident may include a networking incident in which one or more routers fails to work as intended. An incident may include a text description or a root cause analysis. A text description may include documentation of the incident, an identification of one or more systems that were affected by the incident, or a variety of other information related to the incident. A root cause analysis may include a description that describes what occurred during the incident, how the incident happened, why the incident happened, what needs to be corrected to prevent the incident from happening again, or a variety of other information related to the incident. In some embodiments, the text description of an incident may include the root cause analysis of the incident.

Based on detection of the incident, the control system 102 may obtain incident data comprising a text description. The control system 102 may generate, via a machine learning model, a first embedding based on the incident data, the first embedding being an embedding of a portion of the incident data, the machine learning model having been trained on a corpus comprising incident text descriptions and control data, generating a plurality of control embeddings corresponding to a plurality of controls, wherein each control of the plurality of controls comprises computer-readable code for preventing one or more corresponding incidents. The control system 102 may determine that the first embedding and a second embedding of the plurality of control embeddings satisfy a similarity threshold. Based on the first embedding and the second embedding satisfying the similarity threshold, the control system 102 may identify a portion of a control that is associated with the second embedding and generate an alert related to updating the portion of the control.

In some embodiments, the control system 102 may train a machine learning model that can identify faulty controls and generate recommendations for modifications of the faulty controls before an incident occurs. The control system 102 may train a machine learning model using a training dataset that includes previous faulty controls and the modifications made to correct them. By doing so, the computing system may be able to identify an existing faulty control before an incident occurs, thereby preventing a variety of problems before they occur (e.g., preventing cyber security incidents related to cybersecurity controls, preventing computer networking incidents related to networking controls, etc.).

In one example, the control system 102 may obtain incident data indicative of a control system 102 malfunction. The incident data may include text description of an incident associated with the incident data. The control system 102 may generate, via a machine learning model, a first embedding based on the incident data. The first embedding may be an embedding of a portion of the incident data. As used herein an embedding may be numerical representations of any portion of the incident (e.g., any portion of a text description of an incident, any portion of a root cause analysis of an incident, etc.) expressed as a vector. An embedding may be generated using a term frequency-inverse document frequency, bidirectional encoder representations from transformers (BERT), or a variety of other techniques.

The control system 102 may determine that the first embedding and a second embedding associated with a control satisfy a first similarity threshold. Based on the first embedding and the second embedding satisfying the first similarity threshold, the control system 102 may obtain second text associated with the control. The control system 102 may generate a training sample comprising the second text and a modification to the second text for preventing future incidents. The control system 102 may train, based on a training dataset comprising the training sample, a machine learning model to recommend modifications for faulty controls.

Figure 2:
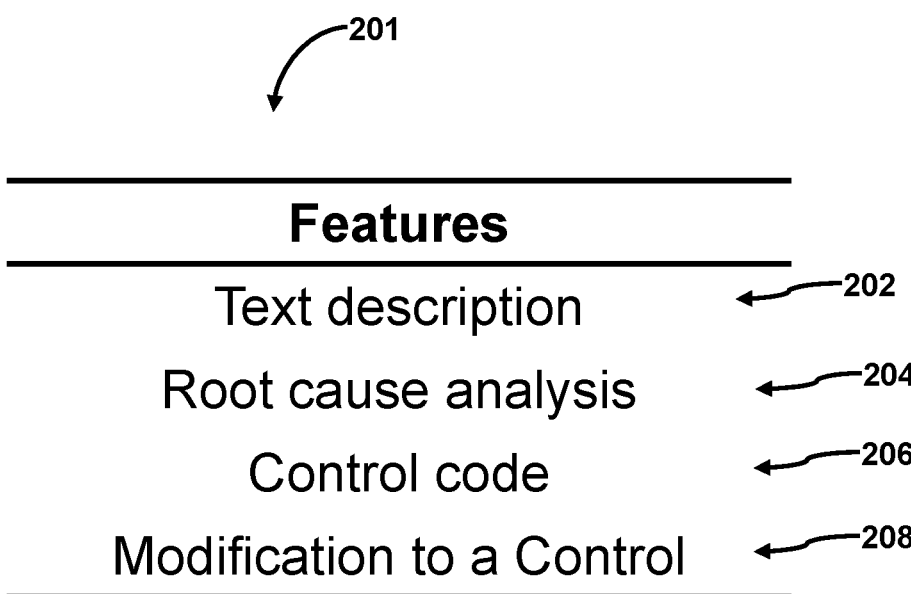
FIG. 2 shows example features for a training dataset, in accordance with one or more embodiments.

Referring to FIG. 2, example features 201 that may be included in a training sample for training a machine learning model to identify faulty controls or generate recommendations to modify faulty controls are shown. The features 201 may include a text description 202. The text description 202 may correspond to an incident or a control. For example, the text description 202 may indicate the purpose of a control. As an additional example, the text description 202 may describe what happened during an incident (e.g., an explanation written in prose). The features 201 may include a root cause analysis 204. The root cause analysis 204 may include a description of what caused an incident. For example, the root cause analysis 204 may indicate that a particular networking setting fails to prevent access to a database due to an update made to an operating system. The features 201 may include control code 206. Control code 206 may be a portion of computer-readable code that implements a control or a portion of a control. For example, the control code 206 may be a portion of code that enforces access restrictions to one or more databases. In one example, the control code 206 may block access to a database. The features 201 may include a modification to a control 208. The modification to a control 208 may indicate the changes that were made to a control (e.g., the modification may have been made by changing written text or changing code) after the control was determined to be faulty by a computing system or a user. For example, the modification may include any changes to settings that were made after determining that a networking setting failed to prevent access to a database due to the update made to the operating system in the example described above.

One or more of the features indicated in FIG. 2 may be used to generate a training sample that may be included in a dataset for training one or more machine learning models described herein. For example, a training sample may include a text description of an incident, control code, and a modification made to the control code. A machine learning model may use the training sample to train to generate modifications for control code that the model has not previously encountered. As an additional example, a training sample may include a text description of an incident, a root cause analysis of an incident, and control code. In this example, the training sample may be used to train a machine learning model described herein to identify a portion of control code that should be modified to prevent future incidents from occurring.

In some embodiments, the control system may use a sliding window technique to identify faulty controls. The control system 102 may take text of a previously identified faulty control and break it down grammatically (e.g., into phrases and/or sentences), translate each string of words (e.g., word, phrase, sentences, paragraphs, etc.) into a vector of embeddings, and then compare each vector with vectors of a second control to determine similarity of the string of words. If two vectors are sufficiently similar, then the control system 102 may determine that the second control uses the same technique as the control previously identified as faulty. Based on identifying the second control as faulty, the control system 102 may put the second control in a manual review queue, mark the second control as insufficient, or automatically change the second control to correlate to a new behavior that fixes the second control.

In some embodiments, the control system 102 may receive a plurality of controls comprising (i) a first control having a first text description and associated with a first label indicating whether the first control is faulty and (ii) a second control having a second text description and associated with a second label indicating whether the second control is faulty. A label may be information that indicates what classification or prediction should be generated for a given sample via a machine learning model. For example, a label for a first sample may be 0 if the control associated with the first sample has not been determined to be faulty, and a label for a second sample may be 1 if the control associated with the second sample has not been determined to be faulty. The control system 102 may obtain control experience scores associated with users that submitted the plurality of controls. As used herein a control experience score may be a numerical value that indicates a user's experience level in creating controls. For example, a higher control experience score may indicate that the user has more experience creating controls as compared to a lower control experience score. The control experience score may indicate how likely a control, written by the user, is faulty. For example, a control written by a user with a lower control experience score may be more likely to be faulty than a control written by a user with a higher control experience score.

A control experience score may be generated based on a variety of factors. For example, a control experience score may be equal to the number of controls a user has written. A control experience score may be equal to the number of controls a user has viewed (e.g., as measured by one or more software applications). A control experience score may be generated using a combination of factors. For example, a control experience score may be generated based on the number of controls a user has written, the number of controls a user has viewed, the number of incidents that have occurred in connection with one or more controls the user has written (e.g., the number of incidents that a user's controls have failed to prevent), or a variety of other factors. A control experience score may be based on other data such as the user's time in their current occupation, the user's length of time working in financial services, previous control submissions written by the user, or previous updates to controls written by the user. A control experience score may be a level assigned to the user (e.g., an overall level, such as a 1-5 scale, a sub-divided level where a user needs assistance in a first aspect of writing a control but not in a second aspect of writing a control, etc.). In some embodiments, a control experience score may be an average of two or more of the above-described factors.

The control experience scores obtained by the control system 102 may include (i) a first control experience score indicating a first experience level of a first user and (ii) a second control experience score indicating a second experience level of a second user. The first control experience score may have been generated based on user information that includes a number of network controls viewed or submitted by the first user and feedback indicating the quality of network controls submitted by the first user.

The control system 102 may generate, as part of a training dataset, a first training sample that includes the first text description of the first network control and a first label indicating whether the first network control is faulty. In response to the first control experience score satisfying a threshold score, the control system 102 may generate the first training sample and include it as part of the training dataset. In response to the second control experience score failing to satisfy the threshold score, the control system 102 may avoid using the second network control as part of the training dataset. The control system 102 may weight the first training sample using train a machine learning model to detect faulty network controls using the first training sample of the training dataset by applying a first weight derived from the first control experience score to the first training sample.

In some embodiments, the control system 102 may provide assistance to users that are writing controls. In some cases, when controls are written they may be done in such a way that it is insufficiently written (lacking information or not fully solving the problem it is set out to prevent) or incorrectly written (does not follow standardization). The control system 102 may use machine learning to personalize the submission process of a control based on the specific user who is writing it (e.g., through the use of a control experience score associated with the specific user). Doing so may reduce risk implications (e.g., to computer security, etc.) by preventing controls from being written poorly.

In some embodiments, the control system 102 may generate or provide a specific template with empty fields to fill out such as Who, What, Why and How (e.g., for a user with a control experience score that is less than a threshold score). In some embodiments, the control system 102 may provide real time (e.g., within a threshold amount of time) grading of completeness. For example, the control system 102 may output a score between 0 and 100 as it is written and may update the score as modifications are made to the control. For some users with control experience scores that are less than a threshold score (e.g., less than 2 out of 5, a user that is identified as needing the most help, etc.), a "passing" grade may be required in order to save or implement the user's control submission. In some embodiments, the control system 102 may highlight areas that need to be adjusted. In some embodiments, the control system 102 may use the subject entry of the control to predict a time frame (when)

and the responsible party (who) may help guide a user (who fails to satisfy a user experience control threshold) in creating controls. By doing so, the control system 102 may make the process of filling out the control more efficient and consistent with other controls thereby increasing the security of a computing system. In some embodiments, a machine learning model used by the control system 102 may learn over time and decide if a user no longer needs the support in the submission of controls and may generate output indicating more advanced submission process flows, or generate output indicating that may be used to allow the user to turn off the assistance.

Figure 3:
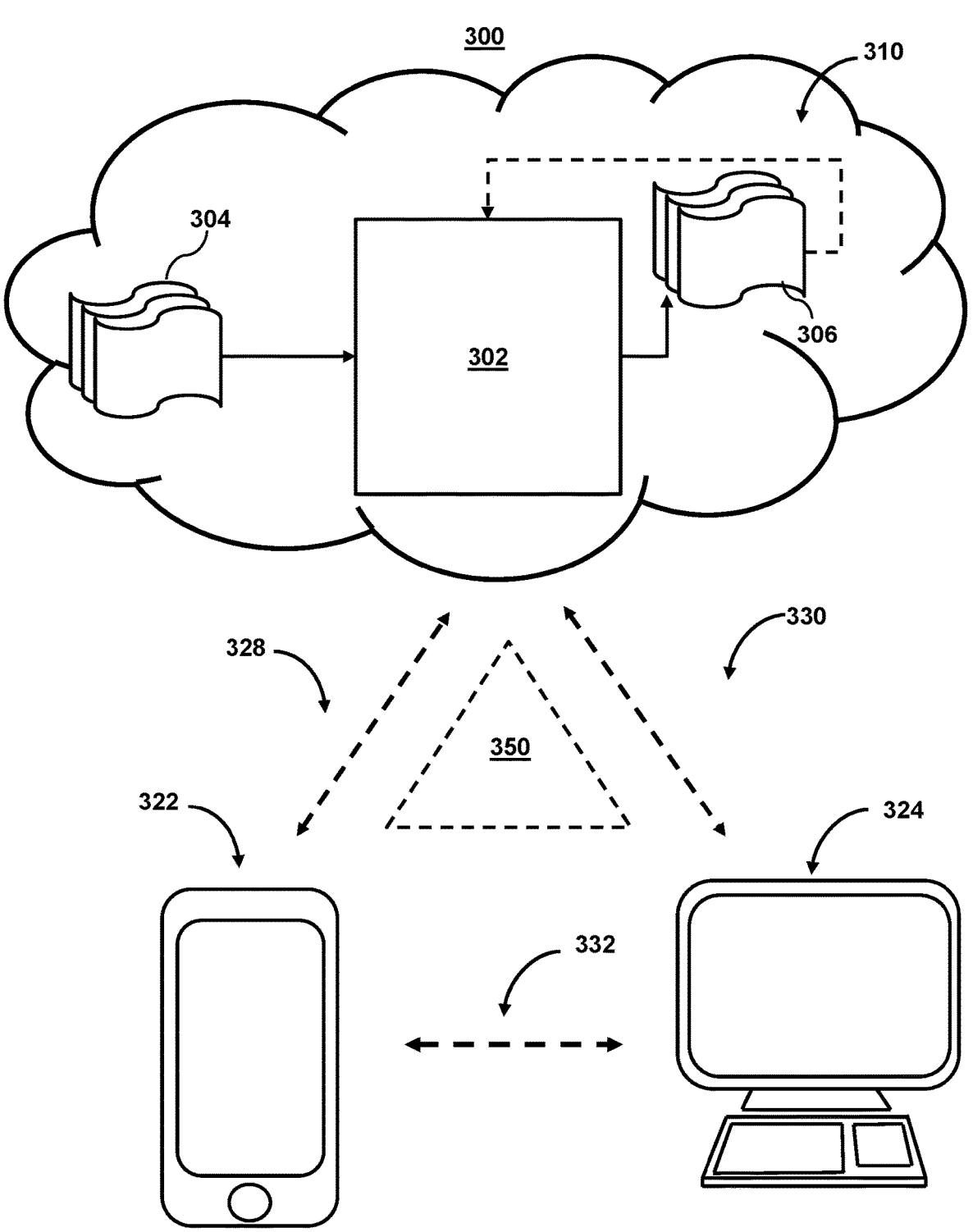
FIG. 3 shows illustrative components for a system that may use machine learning to identify faulty controls, in accordance with one or more embodiments.

FIG. 3 shows illustrative components for a system 300 used for configuration of machine learning models for different purposes (e.g., to use machine learning to detect faulty controls, make recommendations for modifications of faulty controls, generate embeddings, or a variety of other aspects described in connection with FIGS. 1, 2, and 4-6), in accordance with one or more embodiments. The components shown in system 300 may be used to perform any of the functionality described above in connection with FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, mobile devices, and/or any device or system described in connection with FIGS. 1-2, and 4. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to detecting faulty controls, modifying faulty controls or a variety of other aspects described in connection with FIGS. 1, 2, and 4-6.

Each of these devices may also include electronic storages. The electronic storages may include non-transitory storage media that electronically stores information. The electronic storage media of the electronic storages may include one or both of (i) a system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IP TV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the recommendation system 102 or the user device 104 described in connection with FIG. 1.

Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., to use machine learning to detect faulty controls, make recommendations for modifications of faulty controls, generate embeddings, or a variety of other aspects described in connection with FIGS. 1, 2, and 4-6).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error, for example, to adjust weights of a neural network to improve performance of the neural network). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The model (e.g., model 302) may detect faulty controls, make recommendations for modifications of faulty controls, generate embeddings, or a variety of other aspects described in connection with FIGS. 1, 2, and 4-6.

System 300 also includes application programming interface (API) layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols, such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

Figure 4:
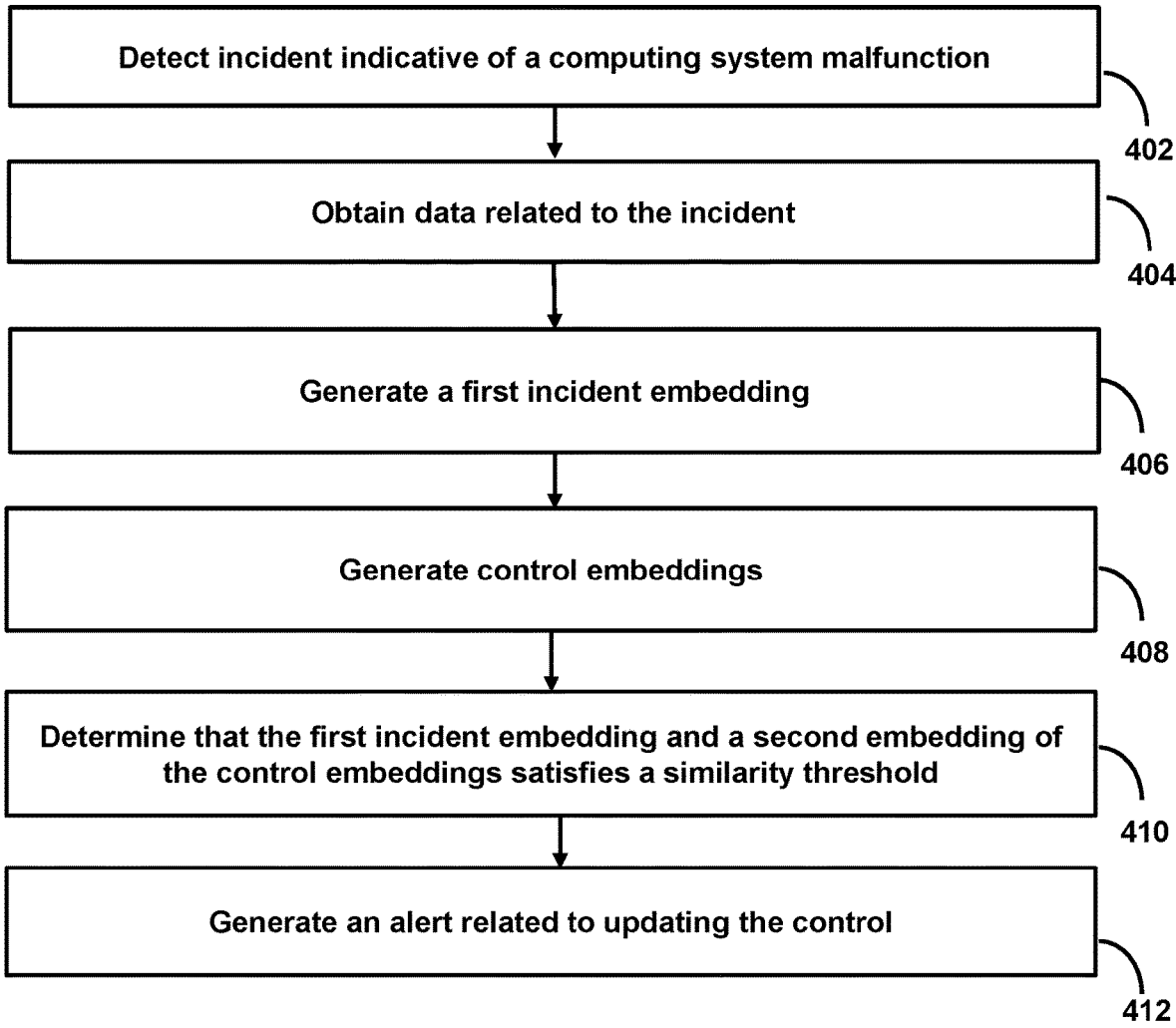
FIG. 4 shows a flowchart of the steps involved in using incident data to detect and update faulty controls, in accordance with one or more embodiments.

FIG. 4 shows a flowchart of the steps involved in for using incident data to detect and update faulty controls, in accordance with one or more embodiments. Although described as being performed by a computing system, one or more actions described in connection with process 400 of FIG. 4 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 402, a computing system may detect an incident that is indicative of a computing system malfunction. For example, the computing system may detect a network incident indicative of a computing system malfunction. The detected incident may be any incident described above in connection with FIG. 1.

At step 404, the computing system may obtain data related to the incident. For example, the computing system may obtain network incident data related to the network incident (e.g., in response to detecting the incident). The network incident data may include a text description and a root cause analysis of the network incident. By obtaining data related to the incident, the computing system may use the data to identify controls that may have been intended to prevent the incident. If a control that is associated with the incident is identified, the computing system may determine that the control is faulty because the control failed to prevent the incident. The computing system may then generate a recommendation to modify the control as explained in more detail below. Alternatively, if no control is identified, the computing system may determine that a new control should be created to prevent similar incidents from occurring in the future.

At step 406, the computing system may generate a first incident embedding. For example, the computing system may generate the first incident embedding by inputting a portion of the network incident data into a machine learning model. The machine learning model may have been trained on a corpus that includes text descriptions, root cause analyses, and control data associated with incidents (e.g., network incidents). The corpus may include any data related to incidents or controls described above in connection with FIGS. 1-2.

At step 408, the computing system may generate control embeddings. For example, the computing system may generate a plurality of control embeddings that correspond to controls (e.g., network controls). The controls may be any control described above in connection with FIG. 1. The controls may include computer-readable code that are designed to prevent one or more incidents (e.g., network incidents). For example, the controls may include portions of code that implement a firewall, an intrusion detection system, a network adapter driver, or a variety of other network related tasks. The embeddings generated by the computing system may allow text associated with an incident and code associated with a control to be mapped to the same vector space. In this way, the computing system may be able to directly compare incidents with controls and determine whether an incident is associated with a control (e.g., they have a similar subject, etc.).

At step 410, the computing system may determine that the first incident embedding and a second embedding of the control embeddings satisfies a similarity threshold. For example, the computing system may compare the first incident embedding with each embedding of the control embeddings (e.g., using a similarity metric such as cosine distance, Euclidean distance, Manhattan distance, etc.). In one example, the computing system may determine that the similarity threshold is satisfied by determining a distance score indicating a distance between the first embedding (e.g., of an incident) and the second embedding (e.g., of a control). Based on the distance score being lower than a threshold score, the computing system may determine that the similarity threshold is satisfied.

Alternatively, the computing system may use a clustering model to determine that the first incident embedding and a second embedding of the control embeddings satisfies a similarity threshold. For example, the computing system may input the first incident embedding and the plurality of control embeddings into a clustering model. The clustering model may assign each embedding to a cluster. An embedding that is assigned to the same cluster as the first incident embedding may be determined to satisfy a similarity threshold with the first incident embedding (e.g., because the embeddings belong to the same cluster of embeddings). By doing so, the computing system may determine which controls are related to the incident. By identifying which controls are related to the incident, the computing system may notify a user or recommend a change to the control so that the control can be modified to prevent future incidents from occurring.

At step 412, the computing system may generate an alert related to updating a control (e.g., the control that was identified as satisfying a similarity threshold with the first incident embedding at step 410). For example, in response to the clustering model indicating that the first incident embedding and the first control embedding satisfy a similarity threshold, the computing system may generate an alert indicating that the control should be updated. In some embodiments, the computing system may generate an update template for updating one or more portions of the first network control, for example, based on the clustering model indicating that the first incident embedding and the first control embedding satisfy a similarity threshold. The update template may assist a user to revise a control or to create a new control. The template may include a number of fields that require input to generate a new control. For example, the template may have fields for identification of a computing system or service, parameters for restricting access to a computing system, or a variety of other fields.

In some embodiments, the computing system may determine an update or change for a control based on changes that have been made to other controls that are similar to the control for which an update is needed. For example, generating an alert related to updating a control or a portion of a control may include using the first control embedding and embeddings of historical controls (e.g., previously modified controls) to identify a historical control that is similar to the first control. The computing system may then determine that a modification made to the historical control should be applied to the control for which an update is needed (e.g., the control identified at step 410). The computing system may identify a modification made to a previous control based on the first control embedding and an embedding associated with the historical control satisfying a similarity threshold. Based on identifying the modification, the computing system may send a recommendation to apply the modification to the first control.

Additionally or alternatively, a template may be used to generate a new control. The template may include a plurality of fields with corresponding prompts (e.g., questions) and the computing system may determine the appropriate information to place in each field. For example, the computing system may obtain a control template comprising an indication (e.g., a field or prompt) for an entity. The computing system may determine, based on the incident data, an identification for the entity. For example, the entity may be a user associated with the incident, an external entity that caused the incident, or a variety of other entities. The computing system may generate the new control based on the control template and the identification for the entity.

In some embodiments, the computing system may identify a portion of the control that should be modified. For example, after determining that a particular control is associated with an incident, the computing system may try to determine a part of the control that is faulty (e.g., the part of the control that led to the incident occurring). The portion of the control that should be modified may be identified using data related to the incident obtained at step 404. For example, the computing system may compare one or more key words associated with the incident with one or more variables of the computer-readable code. Based on the one or more key words matching the one or more variables, the computing system may identify, for modification, a threshold portion of code surrounding the one or more variables. By using data related to the incident, the computing system may identify a specific portion of the control that should be changed and thereby may be able to prevent similar incidents from occurring in the future.

In some embodiments, the computing system may generate a user interface for displaying one or more aspects described above. For example, the computing system may generate a user interface for displaying the first training sample and the first control experience score. The computing system may cause display of the user interface at a user device.

In some embodiments, the computing system may determine that a control should no longer be enforced or used based on the experience level of a user that created the control. For example, based on determining a user that wrote a control, the computing system may generate a control experience score (e.g., as described in connection with FIG. 1 or FIG. 6) indicating an experience level of the user that wrote the control. Based on the user score failing to satisfy a threshold score, the computing system may cease enforcing the control. For example, the computing system may cease calling one or more functions that implement the control. Alternatively, the computing system may flag the control so that a user may cause the control to no longer be enforced (e.g., through one or more system commands). Alternatively, the computing system may determine that a control should be enforced based on the experience level of a user satisfying a threshold. For example, based on determining a user that wrote the control, the computing system may generate a user score indicating an experience level of the user that wrote the control. Based on the user score satisfying a threshold score, the computing system may require the control to be enforced.

In some embodiments, the computing system may train a machine learning model to generate recommendations for modifying faulty controls. For example, the computing system may generate a training sample that includes control code of the control associated with the second embedding (e.g., the embedding that was determined to satisfy a similarity threshold when compared with the incident embedding as described above) and a modification to the control code for preventing future incidents. The modification may be a modification made by a user to fix the control. After generating a training dataset based on the training sample, the computing system may train a machine learning model to recommend modifications for faulty controls.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or to increase the speed of the system or method. Furthermore, it should be noted that any of the components, devices, or equipment discussed in relation to the figures above could be used to perform one or more of the steps in FIG. 4.

Figure 5:
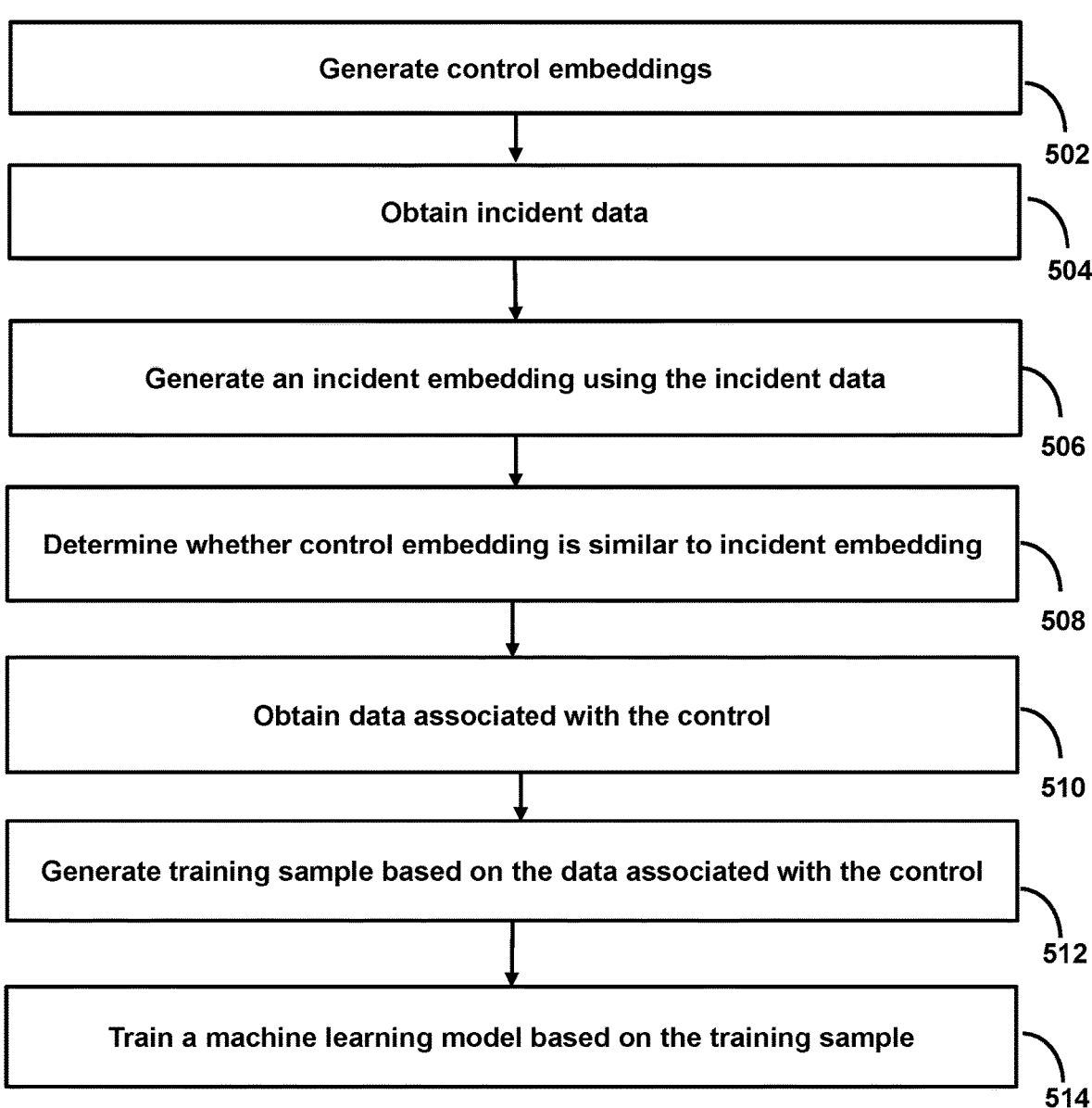
FIG. 5 shows a flowchart of the steps involved in training a machine learning model to identify malfunctioning controls, in accordance with one or more embodiments.

FIG. 5 shows a flowchart of the steps involved in training a machine learning model to identify malfunctioning controls, in accordance with one or more embodiments. Although described as being performed by a computing system, one or more actions described in connection with process 500 of FIG. 5 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 502, a computing system may generate control embeddings. Each control embedding may correspond to a control. For example, each control embedding may correspond to a network control that includes computer-readable code for preventing one or more network incidents. Additionally or alternatively, one or more control embeddings may be generated based on text associated with a control. For example, a control may include text that indicates one or more business rules. In one example, text of a control may include "At least quarterly, call center managers will randomly sample 5 calls from the previous quarter for each of their associates and listen to them ensure there is no profanity from the call center agent," which may be designed to prevent incidents where employees of the business speak profanely to customers. This example control may be determined by the computing system to be faulty, for example, after detecting incidents where employees speak profanely to customers. In this example, the text of the control may be used to generate an embedding of the control (e.g., by inputting the text into a machine learning model).

At step 504, the computing system may obtain incident data. For example, the computing system may obtain network incident data indicative of a computing system malfunction. The network incident data may include a text description and a root cause analysis of an incident associated with the network incident data. The incident and obtained incident data may be any incident described above in connection with FIG. 1.

At step 506, the computing system may generate an incident embedding using the incident data obtained at step 504. For example, the computing system may generate a first incident embedding using the network incident data. The first incident embedding may be an embedding of a portion of the network incident data. For example, the first incident embedding may be an embedding of the root cause analysis of the incident.

At step 508, the computing system may determine whether the incident embedding is similar to a control embedding. For example, the computing system may compare the incident embedding with each embedding of the control embeddings generated at step 502. The computing system may use a similarity metric (e.g., distance score) such as cosine distance, Euclidean distance, Manhattan distance, or a variety of other similarity metrics to determine whether the incident embedding is similar to a control embedding. Based on the distance score being lower than a threshold score, the computing system may determine that the incident embedding is similar to the control embedding. By determining a control embedding that is similar to the incident embedding, the computing system may use the corresponding incident or the control (e.g., and their corresponding embeddings) to train a machine learning model to identify other controls that may be similar. Other controls that are similar may also have similar deficiencies that the control associated with the incident has. In this way, the computing system may be able to train a machine learning model to identify other faulty controls.

At step 510, the computing system may obtain data associated with the control. For example, based on an incident embedding and a control embedding being similar (e.g., satisfying a similarity threshold), the computing system may obtain a second text associated with the control. The second text may include some or all of the text used to generate the control embeddings in step 502. By obtaining data associated with the control (e.g., the second text), the computing system may be able to generate a training sample that can be used to identify other faulty (e.g., malfunctioning) controls.

At step 512, the computing system may generate a training sample, for example, based on the data obtained in step 510. For example, the computing system may generate a training sample that includes the data associated with the control (e.g., the second text) and a modification that was made to the data associated with the control. The modification may have been made by a user to prevent future incidents associated with the control. For example, the modification may have added or removed text from the control. As an additional example, the modification may include a change to a portion of computer code associated with the control. By creating a training sample using a control that corresponds to an incident, the computing system may be able to train a machine learning model to identify other controls that may lead to incidents in the future. Using the machine learning model to identify these other controls may enable the computing system to flag the controls modification or modify them to prevent incidents. Steps 502 through 512 may be repeated multiple times to obtain additional training samples. Each training sample may correspond to a different control or incident.

In some embodiments, the computing system may use the control embedding that was determined to be similar to the incident embedding at step 508 to identify other control embeddings for generating additional training samples. For example, in response to the incident embedding and the control embedding satisfying a similarity threshold, the computing system may use the control embedding and a second similarity threshold to identify other control embeddings. By identifying other control embeddings, the computing system may generate additional training samples. Alternatively, by identifying other control embeddings that are similar to the incident, the computing system may be able to generate recommendations to modify the other control embeddings. In this way, the computing system may identify multiple controls that are in need of modification based on a single incident.

At step 514, the computing system may train a machine learning model based on the one or more training samples generated at step 512. For example, the computing system may train, based on a training dataset comprising the training sample generated at step 512, a machine learning model to recommend modifications for faulty controls. Additionally or alternatively, the computing system may train the machine learning model to identify faulty controls. For example, the machine learning model may receive a control as input and may generate output indicating whether the control is faulty. In one example, the machine learning model may generate a score or probability for an input control. The score may be compared with a threshold to determine whether a control is faulty or not. For example, if the score is greater than a threshold score, the control may be considered faulty. If the score is less than a threshold score, the control may be considered as not faulty.

In one example, the machine learning model may be a neural network (e.g., long short-term memory model, a gated recurrent unit, or a variety of other neural networks). In this example, the computing system may modify a plurality of weights of the machine learning model through backpropagation based on determining that a classification of the machine learning model does not match a label of a corresponding training sample. In some embodiments, the computing system may generate a user interface comprising a progress bar indicating training progress of the machine learning model and cause display of the user interface.

In some embodiments, the machine learning model trained by the computing system may be used to screen new controls before they are put into production or used by an organization. For example, the computing system may receive a request for implementation of a new control. The request may include new control information (e.g., text, computer-readable code, etc.) associated with the new control. Based on the new control information, the computing system may classify, via the machine learning model, the new control text as not faulty. Based on the new control information being classified as not faulty, the computing system may accept the request for implementation of the new control. For example, the computing system may allow the new control to be placed in production or otherwise used by an organization. As an additional example, the computing system may receive a request for implementation of a new control, which includes new control information (e.g., text or computer-readable code) associated with the new control. Based on the new control information, the computing system may classify, via the machine learning model, the new control information as faulty. Based on the new control text being faulty, the computing system may reject the request for implementation of the new control.

In some embodiments, the computing system may discard a training sample based on the experience level of a user that wrote a control associated with the training sample. For example, based on determining a user that wrote the control, the computing system may generate a user score indicating an experience level of the user that wrote the control (e.g., the control experience score described in connection with FIG. 1 or FIG. 6). Based on the user score failing to satisfy a threshold score, the computing system may discard the control from the training dataset.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
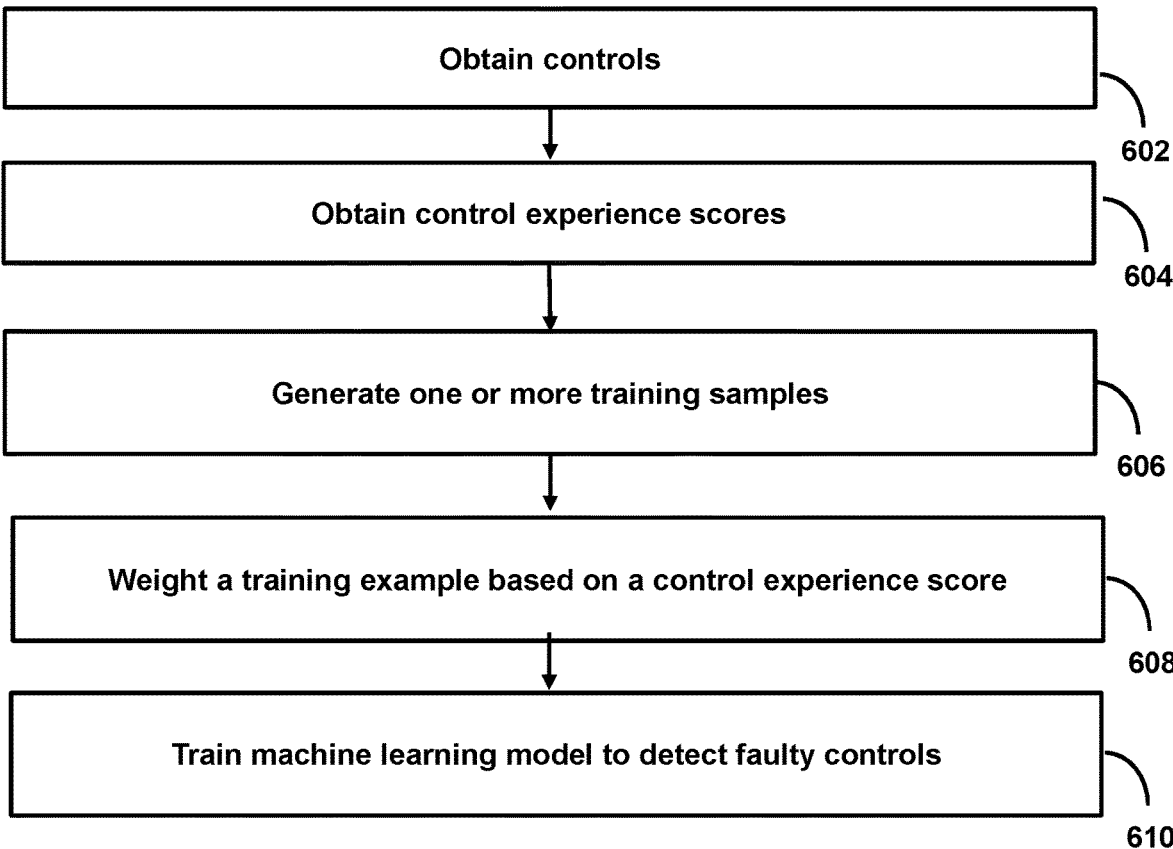
FIG. 6 shows a flowchart of the steps involved in obtaining improved data for training machine learning models, in accordance with one or more embodiments.

FIG. 6 shows a flowchart of the steps involved in obtaining improved data for training of machine learning models (e.g., to detect or modify faulty controls), in accordance with one or more embodiments. Although described as being performed by a computing system, one or more actions described in connection with process 600 of FIG. 6 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 602, a computing system may obtain or receive controls. The controls may be network controls or a variety of other controls (e.g., any control described above in connection with FIG. 1). In one example, the plurality of controls may include a first network control and a second network control. The first network control may have a first text description and may be associated with a first label indicating whether the first network control is faulty. The second network control may have a second text description and may be associated with a second label indicating whether the second network control is faulty.

At step 604, the computing system may obtain control experience scores. The computing system may obtain the control experience scores in response to obtaining the controls in step 602. The control experience scores may be associated with users that submitted the plurality of network controls. For example, each control experience score may be assigned to one user and may indicate the experience level for writing controls of the assigned user. In one example, a first control experience score may indicate a first experience level of a first user and a second control experience score may indicate a second experience level of a second user. In this example, the first control experience score may have been generated based on user information that includes a number of network controls viewed or submitted (e.g., written) by the first user. The user information may further include feedback indicating a quality level of controls submitted by the first user. User information that corresponds to the second user may also be obtained by the computing system. By obtaining control experience scores and user information the computing system may be able to determine how much weight a control should be given based on the user that submitted or wrote the control. For example, a higher weight may be given to a control that is written by a user that is more experienced. Doing so may enable the computing system to determine higher quality data for training a machine learning model as described in more detail below.

In some embodiments, the computing system may generate the control experience score based on user information associated with the user for which the control experience score is being generated. For example, the computing system may generate the first control experience score by generating a weighted average of the number of controls viewed by the first user and the number of controls submitted by the first user.

At step 606, the computing system may generate one or more training samples. For example, the computing system may generate a first training sample that includes the first text description of the first network control described in step 602. In this example, the first training sample may include the first label indicating whether the first network control is faulty. The computing system may determine whether a control should be used as part of a training sample based on a control experience score of the user that wrote the control. For example, in response to the first control experience score satisfying a threshold score, the computing system may generate the first training sample described above. The first training sample may be included as part of a training dataset that includes other training samples. By doing so, the computing system may be able to maintain a higher quality dataset for training machine learning models. This may enable a machine learning model to train more quickly (e.g., with less computing resources) or may enable the machine learning model to obtain better performance (e.g., with higher accuracy, precision, recall, etc.). The first training sample may be weighted based on the first control experience score.

In some embodiments, the computing system may determine the weight for a training sample. For example, the computing system may derive the first weight by multiplying the first weight by the number of controls viewed by the first user and dividing the first weight by a number of incidents associated with the first control or a number calculated using the number of incidents associated with the control.

In one example, in response to the second control experience score failing to satisfy the threshold score, the computing system may avoid generating a training sample that includes the second network control. For example, based on receiving a second control, the computing system may generate or obtain a second control experience score indicating an experience level of a second user associated with the second control. Based on the second control experience score failing to satisfy the threshold score, the computing system may discard the second control from a training dataset associated with the machine learning model.

In some embodiments, the computing system may provide assistance to a user that is inexperienced. For example, based on the second control experience score failing to satisfy the threshold score, the computing system may generate a control template comprising a plurality of prompts for writing a new control (e.g., any prompt described in connection with FIG. 1). The computing system may send the control template to a user device associated with the second user.

In some embodiments, the computing system may recommend modifying a control. For example, based on receiving a second control, the computing system may generate a second control experience score indicating an experience level of a second user associated with the second control. Based on the second control experience score failing to satisfy the threshold score, the computing system may send, to a user device, a recommendation to modify the second control.

In some embodiments, the computing system may use the control experience score to determine the label of a training sample. For example, based on the first control experience score satisfying a threshold score, the computing system may assign a label to the first control indicating that the first control is not faulty. As an additional example, based on the second control experience score failing to satisfy the threshold score, the computing system may assign a label to the second control indicating that the second control is faulty.

In some embodiments, the computing system may use incidents associated with a control to determine the label for the control. For example, the computing system may retrieve, from a database, a value indicating a quantity of incidents associated with the first control. The incidents may be incidents that the first control was designed to prevent. The computing system may determine the first label of the first training sample based on based on the quantity of incidents. For example, if the quantity of incidents is greater than a threshold quantity (e.g., 1, 5, 50, etc.), the computing system may determine that the first label should indicate that the first control is faulty. If the quantity of incidents is less than a threshold quantity, the computing system may determine that the first label should indicate that the first control is not faulty.

At step 608, the computing system may weight a training example based on a control experience score. For example, the machine learning model may be trained with the first training sample of the training dataset by applying a first weight derived from the first control experience score to the first training sample. The first training sample may be weighted based on the first control experience score. For example, the first control experience score may be used by a sample re-weighting model to adjust the weight of the first training sample. As an additional example, the first control experience score may be used to scale a loss function associated with a machine learning model that the first training sample is used to train. The first control experience score may be normalized (e.g., with other control experience scores corresponding to other training samples) and may be multiplied by the loss output by a loss function of a machine learning model. The resulting product may be used by the machine learning model to update the weights or other parameters of the machine learning model.

At step 610, the computing system may train a machine learning model to detect faulty controls. For example, the computing system may use the training dataset that includes the first training sample described in step 606 to train the machine learning model. The computing system may train a machine learning model using the training dataset, for example, as described in connection with FIG. 3 above. In one example, the computing system may train the machine learning model by modifying a plurality of weights of the machine learning model through backpropagation based on determining that a classification of the machine learning model does not match a label of a corresponding training sample.

In some embodiments, the computing system may generate a user interface (e.g., a graphical user interface) to enable a user to visualize one or more aspects described above. For example, the computing system may generate a user interface for displaying the first training sample and the first control experience score and may cause display of the user interface at a user device.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a plurality of controls comprising (i) a first control having a first text description and associated with a first label indicating whether the first control is faulty; obtaining control experience scores associated with users that submitted the plurality of controls, the control experience scores comprising a first control experience score indicating a first experience level of a first user; based on the first control experience score satisfying a threshold score, generating, as part of a training dataset, a first training sample comprising the first text description of the first control; and training, based on the training dataset, a machine learning model to detect faulty controls.

2. The method of any of the preceding embodiments, further comprising: based on receiving a second control, generating a second control experience score indicating an experience level of a second user associated with the second control; and based on the second control experience score failing to satisfy the threshold score, discarding the second control from a training dataset associated with the machine learning model.

3. The method of any of the preceding embodiments, further comprising: based on the second control experience score failing to satisfy the threshold score, generating a control template comprising a plurality of prompts for writing a new control; and sending the control template to a user device associated with the second user.

4. The method of any of the preceding embodiments, further comprising: based on the first control experience score satisfying a threshold score, assigning a label to the first control indicating that the first control is not faulty.

5. The method of any of the preceding embodiments, further comprising: generating a user interface for displaying the first training sample and the first control experience score; and causing display of the user interface at a user device.

6. The method of any of the preceding embodiments, further comprising generating the first control experience score by: generating a weighted average of the number of controls viewed by the first user and the number of controls submitted by the first user.

7. The method of any of the preceding embodiments, further comprising deriving the first weight by: multiplying the first weight by the number of controls viewed by the first user; and dividing the first weight by a number of incidents associated with the first control.

8. The method of any of the preceding embodiments, wherein training a machine learning model to detect faulty controls comprises: modifying a plurality of weights of the machine learning model through backpropagation based on determining that a classification of the machine learning model does not match a label of a corresponding training sample.

9. The method of any of the preceding embodiments, further comprising: based on receiving a second control, generating a second control experience score indicating an experience level of a second user associated with the second control; and based on the second control experience score failing to satisfy the threshold score, sending, to a user device, a recommendation to modify the second control.

10. The method of any of the preceding embodiments, further comprising: retrieving, from a database, a value indicating a quantity of incidents associated with the first control; and determining the first label of the first training sample based on based on the quantity of incidents.

11. A method comprising: detecting an incident indicative of a computing system malfunction; based on detection of the incident, obtaining incident data comprising a text description; generate, via a machine learning model, a first embedding based on the incident data, the first embedding being an embedding of a portion of the incident data, the machine learning model having been trained on a corpus comprising incident text descriptions and control data; generating a plurality of control embeddings corresponding to a plurality of controls; determining that the first embedding and a second embedding of the plurality of control embeddings satisfy a similarity threshold; and based on the first embedding and the second embedding satisfying the similarity threshold, identifying a portion of a control that is associated with the second embedding.

12. The method of any of the preceding embodiments, wherein identifying the portion of the control that is associated with the second embedding comprises: comparing one or more key words associated with the incident with one or more variables of the computer-readable code; and based on the one or more key words matching the one or more variables, identifying a threshold portion of code surrounding the one or more variables for modification.

13. The method of any of the preceding embodiments, further comprising: generating, via the machine learning model and based on second data associated with a second incident, a third embedding; and based on a determination that the third embedding does not satisfy a similarity threshold with other embeddings, generating a new control.

14. The method of any of the preceding embodiments, wherein generating a new control comprises: obtaining a control template comprising an indication for an entity; determining, based on the incident data, an identification for the entity; and generating the new control based on the control template and the identification for the entity.

15. The method of any of the preceding embodiments, wherein generating an alert related to updating the portion of the control comprises: identifying a modification made to a previous control, wherein an the first embedding and an embedding associated with the previous control satisfy the similarity threshold; and sending a recommendation to apply the modification to the control.

16. The method of any of the preceding embodiments, further comprising: based on determining a user that wrote the control, generating a user score indicating an experience level of the user that wrote the control; and based on the user score failing to satisfy a threshold score, causing a computing system to no longer enforce the control.

17. The method of any of the preceding embodiments, further comprising: generating a training sample comprising the second control code of the control associated with the second embedding and a modification to the second control code for preventing future incidents; and after generating a training dataset based on the training sample, training a machine learning model to recommend modifications for faulty controls.

18. The method of any of the preceding embodiments, wherein determining that the similarity threshold is satisfied comprises: determining a distance score indicating a distance between the first embedding and the second embedding; and based on the distance score being lower than a threshold score, determining that the similarity threshold is satisfied.

19. The method of any of the preceding embodiments, further comprising: based on determining a user that wrote the control, generating a user score indicating an experience level of the user that wrote the control; and based on the user score satisfying a threshold score, causing a computing system to enforce the control.

20. A method comprising: obtaining incident data indicative of a computing system malfunction; generating, via a machine learning model, a first embedding based on the incident data; determining, based on a comparison of the that the first embedding with and a second embedding associated with a control, that satisfying a first similarity threshold is satisfied; based on the first embedding and the second embedding satisfying the first similarity threshold, obtaining second text associated with the control; generating a training sample comprising the second text and a modification to the second text for preventing future incidents; and training, based on a training dataset comprising the training sample, a machine learning model to recommend modifications for faulty controls.

21. The method of any of the preceding embodiments, further comprising: detecting a second incident indicative of a computing system malfunction, wherein the second incident is associated with second incident data; based on determining a faulty control associated with the second incident, inputting data associated with the faulty control into the machine learning model; and generating, based on output from the machine learning model, a recommendation to modify the faulty control.

22. The method of any of the preceding embodiments, wherein determining that the first similarity threshold is satisfied comprises: determining a distance score indicating a distance between the first embedding and the second embedding; and based on the distance score being lower than a threshold score, determining that the first similarity threshold is satisfied.

23. The method of any of the preceding embodiments, further comprising: receiving a request for implementation of a new control, wherein the request comprises new control text associated with the new control; based on the new control text, classifying, via the machine learning model, the new control text as not faulty; and based on the new control text not being faulty, accepting the request for implementation of the new control.

24. The method of any of the preceding embodiments, further comprising: receiving a request for implementation of a new control, wherein the request comprises new control text associated with the new control; based on the new control text, classifying, via the machine learning model, the new control text as faulty; and based on the new control text being faulty, rejecting the request for implementation of the new control.

25. The method of any of the preceding embodiments, further comprising: generating a user interface comprising a progress bar indicating training progress of the machine learning model; and causing display of the user interface.

26. The method of any of the preceding embodiments, wherein the incident data comprises a root cause analysis of the incident, and wherein generating a first embedding comprises inputting a portion of the root cause analysis into the machine learning model.

27. The method of any of the preceding embodiments, wherein training the machine learning model to recommend modifications for faulty controls comprises: modifying a plurality of weights of the machine learning model through backpropagation based on determining that a classification of the machine learning model does not match a label of a corresponding training sample.

28. The method of any of the preceding embodiments, further comprising: based on determining a user that wrote the control, generating a user score indicating an experience level of the user that wrote the control; and based on the user score failing to satisfy a threshold score, discarding the control from the training dataset.

29. The method of any of the preceding embodiments, wherein the machine learning model comprises a long short-term memory model or a gated recurrent unit.

30. The method of any of the preceding embodiments, wherein the distance score comprises one of Euclidean distance, cosine similarity, or Manhattan distance.

31. A tangible, non-transitory, machine-readable medium storing instructions that, when executed by a data processing apparatus, cause the data processing apparatus to perform operations comprising those of any of embodiments 1-30.

32. A system comprising one or more processors; and memory storing instructions that, when executed by the processors, cause the processors to effectuate operations comprising those of any of embodiments 1-30.

33. A system comprising means for performing any of embodiments 1-30.

What is claimed is:

1. A system for accelerating generation of model training datasets by using network control embeddings corresponding to faulty network controls to detect other faulty network controls prior to known occurrences of related network incidents, the system comprising:

one or more processors and one or more non-transitory media having instructions recorded thereon that, when executed by the one or more processors, cause operations comprising:

generating a plurality of control embeddings corresponding to a plurality of network controls, wherein each network control of the plurality of network controls comprises computer-readable code for preventing one or more corresponding network incidents;

obtaining network incident data indicative of a computing system malfunction, wherein the network incident data comprises a text description and a root cause analysis of an incident associated with the network incident data;

generating a first incident embedding using the network incident data, the first incident embedding being an embedding of a portion of the network incident data;

in response to the first incident embedding and a first control embedding satisfying a first similarity threshold, using the first control embedding and a second similarity threshold to identify other control embeddings of the plurality of control embeddings as candidate faulty controls, the first control embedding being an embedding of a portion of a first network control of the plurality of network controls, the other control embeddings being respective embeddings of portions of other network controls of the plurality of network controls; and generating a training dataset and training a machine learning model using the training dataset to recommend modifications for faulty controls, the training dataset being generated based on the first control embedding and identification of the other control embeddings such that the training dataset comprises data related to the portion of the first network control and at least some of the portions of the other network controls, wherein training the machine learning model comprises modifying one or more weights of the machine learning model through backpropagation based on a determination that a classification of the machine learning model for a respective training sample of the training dataset does not match a label of the respective training sample.

2. A method comprising:

obtaining incident data indicative of a computing system malfunction, wherein the incident data comprises text description of an incident associated with the incident data;

generating a first embedding based on the incident data, the first embedding comprising an incident embedding that is an embedding of at least a portion of the incident data;

determining that the first embedding and a second embedding associated with a control satisfy a first similarity threshold, the second embedding comprising a control embedding that is an embedding of at least a portion of the control;

based on the first embedding and the second embedding satisfying the first similarity threshold, obtaining second text associated with the control;

generating a training sample comprising the second text and a modification to the second text for preventing future incidents; and training, based on a training dataset comprising the training sample, a machine learning model to recommend modifications for faulty controls, wherein training the machine learning model comprises modifying one or more weights of the machine learning model through backpropagation based on a determination that a classification of the machine learning model for a respective training sample of the training dataset does not match a label of the respective training sample.

3. The method of claim 2, further comprising:

detecting a second incident indicative of a computing system malfunction, wherein the second incident is associated with second incident data;

based on determining a faulty control associated with the second incident, inputting data associated with the faulty control into the machine learning model; and generating, based on output from the machine learning model, a recommendation to modify the faulty control.

4. The method of claim 2, wherein determining that the first similarity threshold is satisfied comprises:

determining a distance score indicating a distance between the first embedding and the second embedding; and based on the distance score being lower than a threshold score, determining that the first similarity threshold is satisfied.

5. The method of claim 2, further comprising:

receiving a request for implementation of a new control, wherein the request comprises new control text associated with the new control;

based on the new control text, classifying, via the machine learning model, the new control text as not faulty; and based on the new control text not being faulty, accepting the request for implementation of the new control.

6. The method of claim 2, further comprising:

receiving a request for implementation of a new control, wherein the request comprises new control text associated with the new control;

based on the new control text, classifying, via the machine learning model, the new control text as faulty; and based on the new control text being faulty, rejecting the request for implementation of the new control.

7. The method of claim 2, wherein the control comprises an access restriction corresponding to security compliance, and the second embedding comprises an embedding of at least a portion of the access restriction.

8. The method of claim 2, wherein the incident data comprises a root cause analysis of the incident, and wherein generating the first embedding comprises inputting a portion of the root cause analysis into a given machine learning model.

9. The method of claim 2, wherein training the machine learning model to recommend modifications for faulty controls comprises training, based on the training sample comprising control code associated with the control and a code modification to the control code related to preventing future incidents, the machine learning model to recommend control code modifications for faculty controls.

10. The method of claim 2, further comprising:

based on determining a user that wrote the control, generating a user score indicating an experience level of the user that wrote the control; and based on the user score failing to satisfy a threshold score, discarding the control from the training dataset.

11. The method of claim 2, wherein the machine learning model comprises a long short-term memory model or a gated recurrent unit.

12. One or more non-transitory computer-readable media comprising instructions that, when executed by one or more processors, causes operations comprising:

obtaining incident data indicative of a computing system malfunction, wherein the incident data comprises text description of an incident associated with the incident data;

generating a first embedding based on the incident data, the first embedding comprising an incident embedding that is an embedding of at least a portion of the incident data;

determining that the first embedding and a second embedding associated with a control satisfy a first similarity threshold, the second embedding comprising a control embedding that is an embedding of at least a portion of the control;

based on the first embedding and the second embedding satisfying the first similarity threshold, obtaining second text associated with the control;

generating a training sample comprising the second text and a modification to the second text for preventing future incidents; and training, based on a training dataset comprising the training sample, a machine learning model to recommend modifications for faulty controls, wherein training the machine learning model comprises modifying one or more weights of the machine learning model through backpropagation based on a determination that a classification of the machine learning model for a respective training sample of the training dataset does not match a label of the respective training sample.

13. The one or more non-transitory computer-readable media of claim 12, wherein the instructions, when executed, cause operations further comprising:

detecting a second incident indicative of a computing system malfunction, wherein the second incident is associated with second incident data;

based on determining a faulty control associated with the second incident, inputting data associated with the faulty control into the machine learning model; and generating, based on output from the machine learning model, a recommendation to modify the faulty control.

14. The one or more non-transitory computer-readable media of claim 12, wherein determining that the first similarity threshold is satisfied comprises:

determining a distance score indicating a distance between the first embedding and the second embedding; and based on the distance score being lower than a threshold score, determining that the first similarity threshold is satisfied.

15. The one or more non-transitory computer-readable media of claim 12, wherein the instructions, when executed, cause operations further comprising:

receiving a request for implementation of a new control, wherein the request comprises new control text associated with the new control;

based on the new control text, classifying, via the machine learning model, the new control text as not faulty; and based on the new control text not being faulty, accepting the request for implementation of the new control.

16. The one or more non-transitory computer-readable media of claim 12, wherein the instructions, when executed, cause operations further comprising:

receiving a request for implementation of a new control, wherein the request comprises new control text associated with the new control;

based on the new control text, classifying, via the machine learning model, the new control text as faulty; and based on the new control text being faulty, rejecting the request for implementation of the new control.

17. The one or more non-transitory computer-readable media of claim 12, wherein the instructions, when executed, cause operations further comprising:

generating a user interface comprising a progress bar indicating training progress of the machine learning model; and causing display of the user interface.

18. The one or more non-transitory computer-readable media of claim 12, wherein the incident data comprises a root cause analysis of the incident, and wherein generating the first embedding comprises inputting a portion of the root cause analysis into a given machine learning model.

19. The one or more non-transitory computer-readable media of claim 12, wherein training the machine learning model to recommend modifications for faulty controls comprises training, based on the training sample comprising control code associated with the control and a code modification to the control code related to preventing future incidents, the machine learning model to recommend control code modifications for faculty controls.

20. The one or more non-transitory computer-readable media of claim 12, wherein the instructions, when executed, cause operations further comprising:

based on determining a user that wrote the control, generating a user score indicating an experience level of the user that wrote the control; and based on the user score failing to satisfy a threshold score, discarding the control from the training dataset.

* * * * *